United States Patent [19]
Fujii et al.

[11] Patent Number: 6,032,198
[45] Date of Patent: Feb. 29, 2000

[54] APPLICATION DESIGN SUPPORTING METHOD AND APPARATUS FOR CLIENT/SERVER SYSTEM

[75] Inventors: Keiji Fujii; Hiroshi Kanegae, both of Yokohama; Shigetoshi Hayashi, Fujisawa; Masanori Yamada, Yokohama; Masaaki Nagao, Yokohama; Nobuaki Arai, Yokohama; Kiyoshi Takahara, Yokohama; Matsuki Yoshino, Yokohama, all of Japan

[73] Assignee: Hitachi, Ltd., Tokyo, Japan

[21] Appl. No.: 09/038,000

[22] Filed: Mar. 11, 1998

[30] Foreign Application Priority Data

Mar. 14, 1997 [JP] Japan .................................. 9-061241

[51] Int. Cl.[7] ...................................................... G06F 9/45
[52] U.S. Cl. .......................... 709/302; 395/701; 395/705
[58] Field of Search ...................... 395/200.33, 701–703, 395/705–707; 707/103, 1, 10, 100–102; 345/333–336, 356, 967; 709/302, 303, 203, 219

[56] References Cited

U.S. PATENT DOCUMENTS

| | | | |
|---|---|---|---|
| 5,457,797 | 10/1995 | Butterworth et al. | 395/682 |
| 5,517,645 | 5/1996 | Stutz et al. | 395/680 |
| 5,848,273 | 12/1998 | Fontana et al. | 395/701 |
| 5,854,932 | 12/1998 | Mariani et al. | 395/709 |
| 5,860,072 | 1/1999 | Schofield | 707/101 |

FOREIGN PATENT DOCUMENTS 7182150  7/1995  Japan .................................. G06F 9/06

OTHER PUBLICATIONS

English translation of "Examples of Use of ORB: Case of Information Technology Consortium", Computer Today, Jan. 1997 (Exhibit A).

"Three–layer System Designing Method", Nikkei Open System, Feb. 1996,pp 234–247.

"Examples of Use of ORB: Case of Information Technology Consortium", Computer Today, Jan. 1997, pp 27–36.

*Primary Examiner*—Majid A. Banankhah
*Assistant Examiner*—Kakali Chaki
*Attorney, Agent, or Firm*—Antonelli, Terry, Stout & Kraus, LLP

[57] ABSTRACT

In a method for supporting the design of a plurality of programs distributed on a network and operated through the communication between the programs, each program is defined, a relation between programs is defined, interface information of each program is defined, and the interface defined for each program is converted into an interface definition language (IDL) format to generate an IDL file. The definition of each program and the definition of the relation between programs are performed by providing a graphic display screen to which a program represented by a symbol and a relation between programs represented by an arrow are inputted as definition information by a user. The definition of interface information is performed by inputting information defined by the user in an interactive manner.

18 Claims, 20 Drawing Sheets

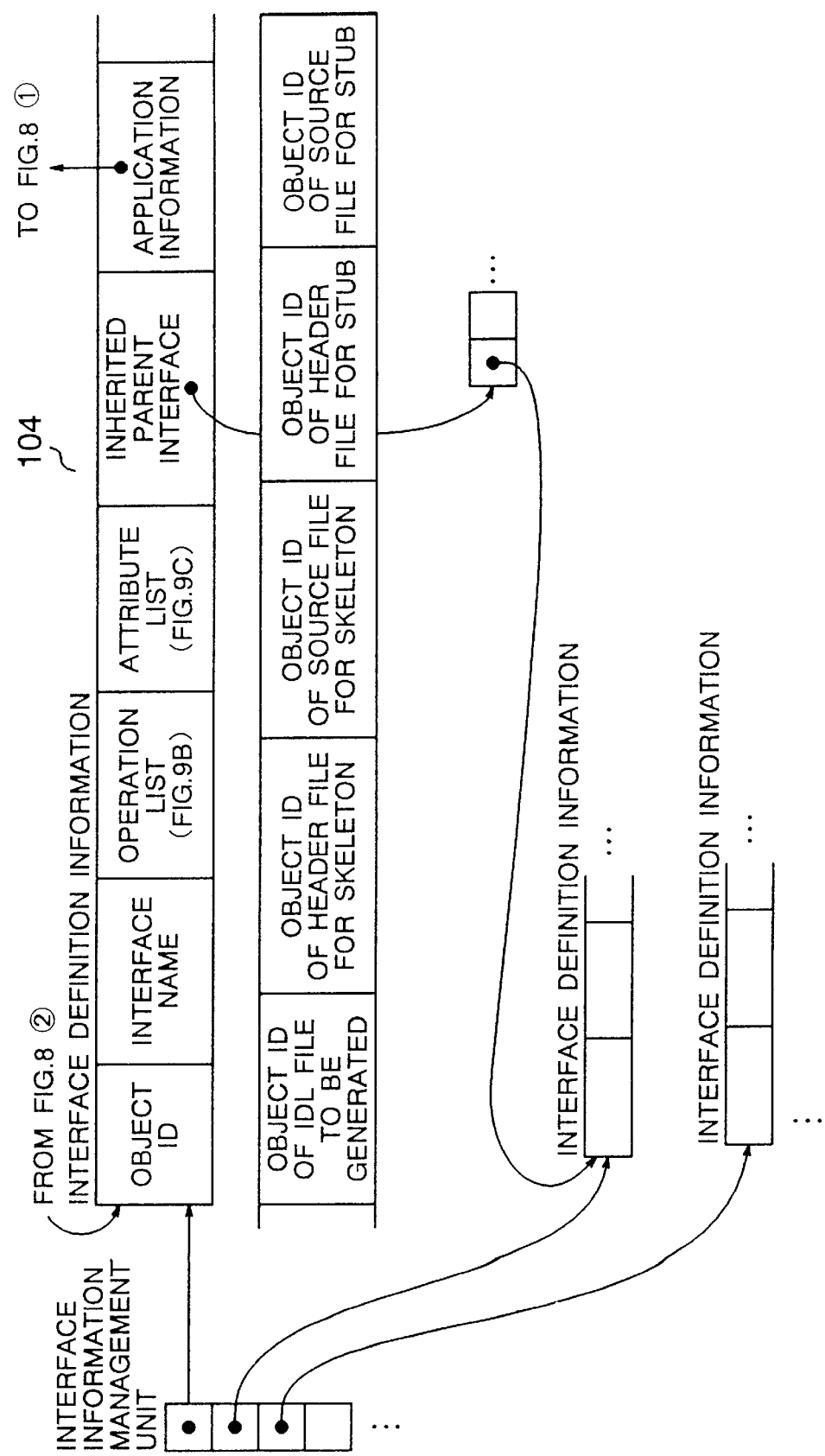

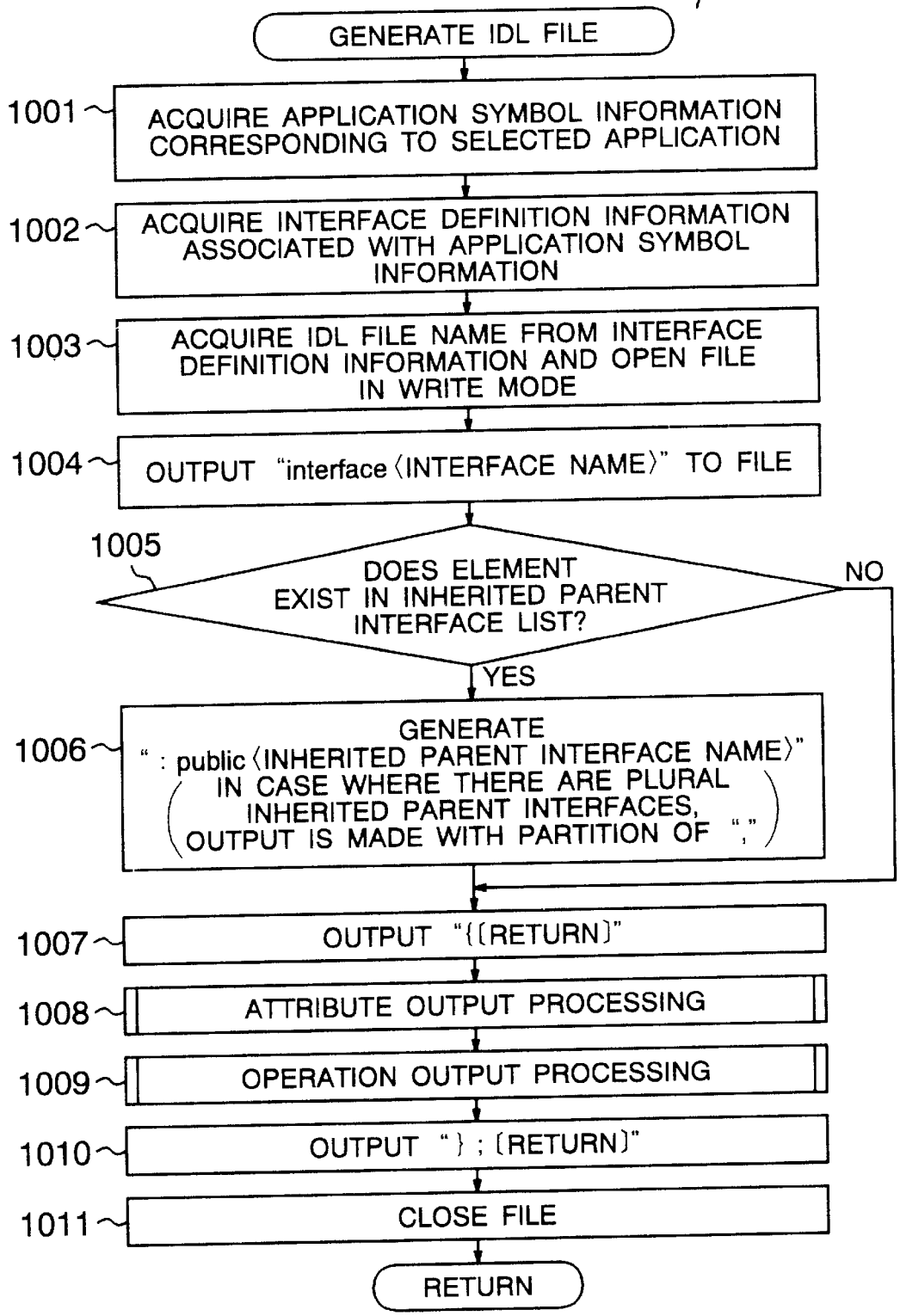

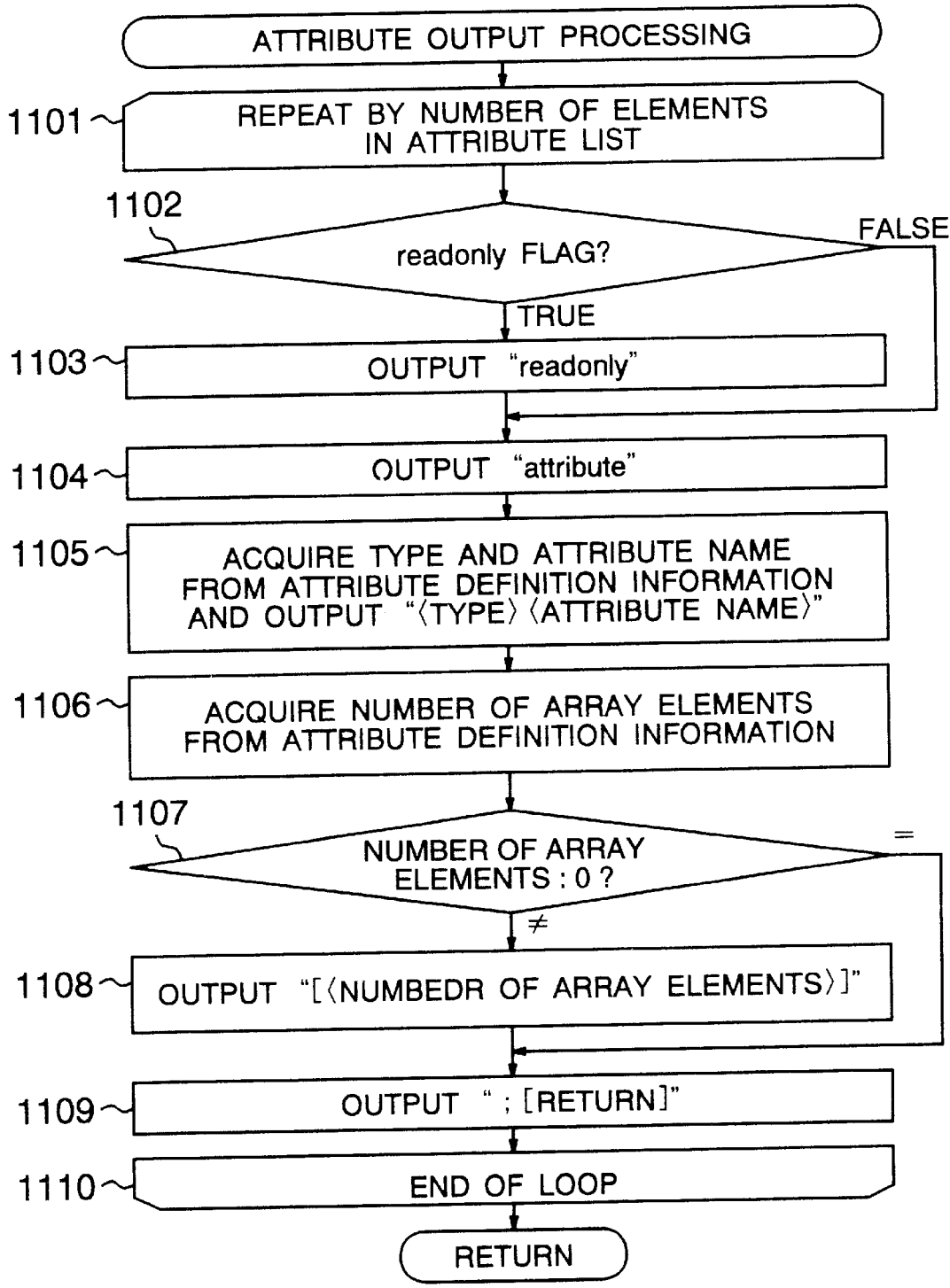

FIG. 18

| OPERATION LIST | | |
|---|---|---|
| INTERFACE NAME | A | |
| OPERATION NAME | TYPE OF RETURN VALUE | ARGUMENT |
| OP1 | void | Item1 |
| OP2 | int | |
| OP3 | void | Item1, Item2 |
| ATTRIBUTE NAME | TYPE | |
| Attr1 | long | |
| Attr2 | long | |

FIG. 19

OPERATION DEFINITION

TYPE OF RETURN VALUE

```
void                  ▼
long
unsigned long
short
       :
```

ARGUMENT

| NAME | INPUT/OUTPUT | TYPE |
|---|---|---|
| Item1 | in | long |

APPLICATION DESIGN SUPPORTING METHOD AND APPARATUS FOR CLIENT/SERVER SYSTEM

BACKGROUND OF THE INVENTION

1. Field of the Invention

The present invention relates to a method and apparatus for designing a client/server system using a distributed application executing environment, and more particularly to a method for the structuring of application programs distributed on a network and the design of application program interfaces and an apparatus for realizing such a method. (Hereinafter, the application program will be referred to simply as application.)

2. Description of the Related Art

Recently, there has been an increased trend to employ an N-layer client/server system (hereinafter abbreviated to C/S system) as an information system in an enterprise, as disclosed by "THREE-LAYER SYSTEM DESIGNING METHOD", Nikkei Open System, February 1996, pp. 234 to 247. The base of the N-layer C/S system includes a distributed application executing environment or object request broker (hereinafter abbreviated to ORB) for realizing the communication between applications distributed on a network. CORBA (Common Object Request Broker Architecture) and DCOM are known as the specifications of communication mechanism between applications or objects.

A three-layer model as a general model of the N-layer C/S system is composed of a presentation layer which performs the input/output of data, a function layer which executes a service logic, and a data base and a data layer which performs a processing for access to the data base. In the case where such a three-layer C/S system is to be structured by distributed applications, a plurality of applications are arranged in each layer. Therefore, it is required that prior to describing the contents of a processing by an application, the interface of the application should be determined while examining the structure of applications of the C/S system and a logical relation between applications.

In the conventional developing method, a developer graphically illustrates a relation between applications by use of a drawing edition tool while examining the division of a C/S system into applications and the consolidation thereof, as disclosed by "EXAMPLES OF USE OF ORB: Case of Information Technology Consortium", Computer Today, January 1997, pp. 27 to 36. The developer describes the interfaces of applications into a specification and generates an IDL (Interface Definition Language) file while examining an IDL format supported by a used ORB. The IDL file is a file for storing interface definition between applications. The developer compiles the generated IDL file by use of an IDL compiler supplied by the ORB. With this compilation, there are generated a skeleton file which includes the function of communication for its own application and a stub file which includes the function of communication for other applications communicating with the application. The developer adds the description of an application processing other than the communication into the generated skeleton file and selects a stub file of another application to be called so that both the files are compiled and linked, thereby completing one application program.

JP-A-7-182150 has disclosed a system in which an interface specification is automatically generated through the interaction with a developer in such a manner that the developer selects the type of an interface specification and the language definition corresponding to the selected type is displayed.

In the above-mentioned conventional method, since the structure of applications of the C/S system, the logical relation between applications and the interface definition are described into the specification and the IDL file is generated on the basis of the specification, there is a problem of mismatching in contents between the specification and the IDL file which may be caused from a human error. Also, since the IDL file is generated while examining the IDL format supported by the ORB, there is a problem that a long time is consumed and an error is liable to occur.

The system disclosed by the JP-A-7-182150 concerns only the generation of the interface specification of each program or application and is silent of the definition of a relation between applications.

SUMMARY OF THE INVENTION

An object of the present invention is to provide a graphic and interactive user interface for the definition of applications, the definition of a relation between applications and the definition of the interfaces of applications.

Another object of the present invention is to automatically generate an IDL file with no need for a developer to be conscious of an IDL format supported by an ORB.

A further object of the present invention is to facilitate the change of data which is commonly used by a plurality of applications and the application interfaces which are commonly used by a plurality of designers.

A still further object of the present invention is to facilitate the reuse of the existing information.

A furthermore object of the present invention is to automatically generate a makefile for application maintenance.

To that end, there is provided an editing apparatus having a diagrammatic edition function with which the definition of applications forming a C/S system and the definition of a logical relation between applications are performed by use of a graphic display screen, an interactive edition function with which the definition of the interfaces of applications is interactively performed, and a function with which the result of definition is stored once and is automatically outputted to an IDL file in a form converted into an IDL format supported by a used ORB.

The editing apparatus may have a function of acquiring data items necessary for definition of arguments and attributes of a program interface of an application from dictionary data which is managed by a repository in a centralized manner, and a function of automatically updating the arguments and attributes of the program interface when the dictionary data is changed.

The editing apparatus may have a function of reading interface information of the existing application and displaying/editing the interface information on a diagram which defines the logical relation between applications.

The editing apparatus may have a function of storing the defined contents of the structure of applications and the logical relation between applications and the defined contents of the interfaces of applications into a repository in units of one system and in units of one application so that the defined contents of the interface of an application to be edited are fetched from the repository.

The editing apparatus may have a function of automatically generating a makefile by specifying stub files and header files of related applications from the defined logical relation between applications and a stub file, a skeleton file and a header file generated by the compilation of an IDL file of an application for which the contents of a processing are to be described.

BRIEF DESCRIPTION OF THE DRAWINGS

FIGS. 9A, 9B and 9C are diagrams which show the table structure of an interface information management unit as a whole;

FIG. 10 is a flow chart showing an IDL file generation processing performed by the editor unit;

FIG. 11 is a flow chart of a processing for outputting an attribute to an IDL file;

FIG. 18 shows an example of an interface defining display screen;

FIG. 19 shows an example of an interface operation defining display screen; and

DESCRIPTION OF THE PREFERRED EMBODIMENTS

An embodiment of the present invention, which employs CORBA, will now be described in details by use of the accompanying drawings.

Figure 1:
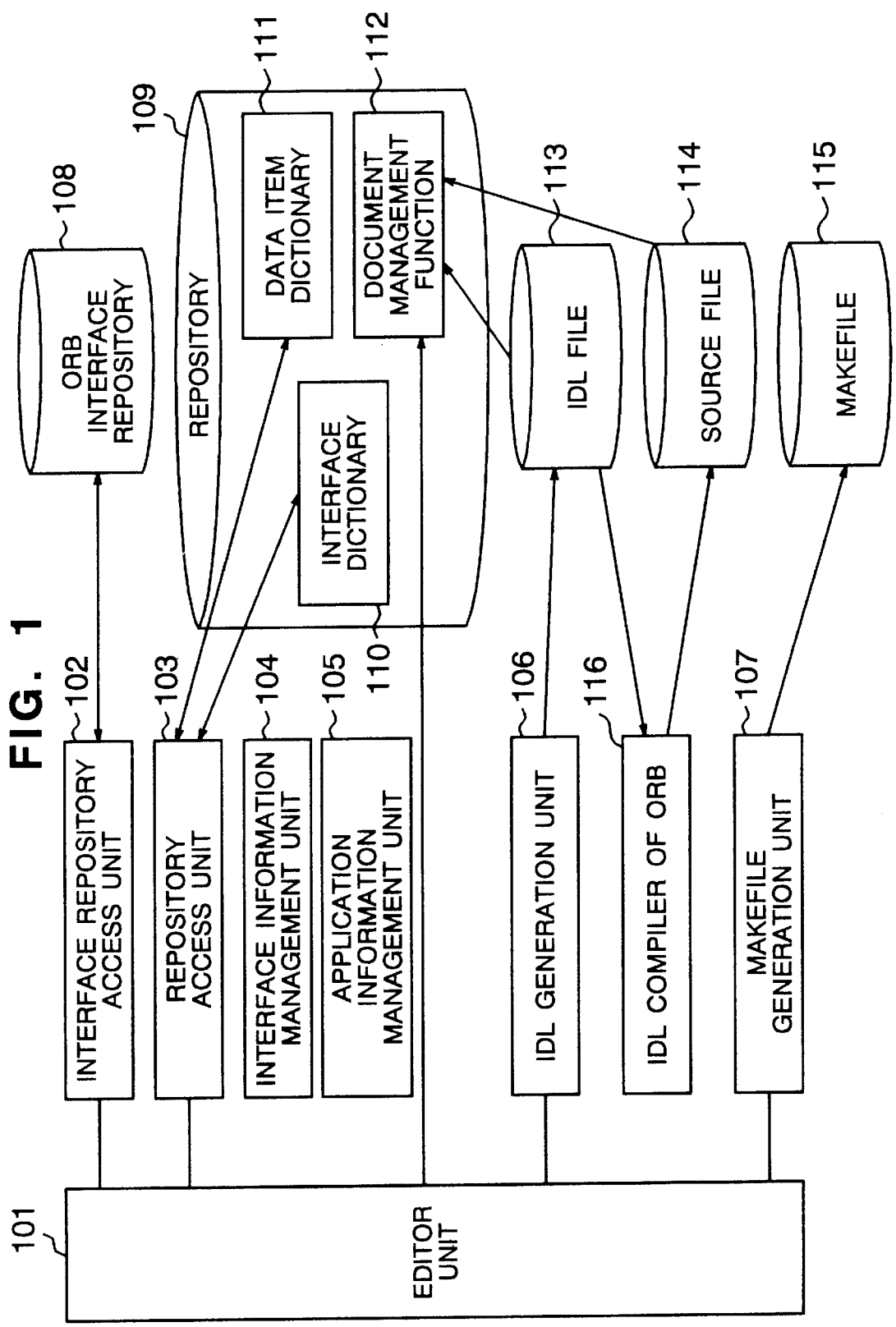
FIG. 1 is a functional block diagram showing an embodiment of the present invention.

FIG. 1 shows an example of a functional block diagram of an editing apparatus according to the present invention. The editing apparatus is realized on a computer. A processor of the computer executes an editing program (or editor unit) so that each function of the editing apparatus is realized by use of a main memory of the computer and external memories. An input device such as a mouse, a keyboard or the like and a display device are indispensable for the editing apparatus. The editing apparatus may be one computer which is provided in a C/S system or a computer for development which does not belong to the C/S system.

Referring to FIG. 1, an editor unit 101 is a software which forms the editing apparatus. The editor unit 101 is provided with a subprogram for each function. The subprograms include an interface repository access unit 102, a repository access unit 103, an IDL generation unit 106 and a makefile generation unit 107. An interface information management unit 104 and an application information management unit 105 are tables in the main memory. The table is generated, referred to and updated by the editor unit 101 and the subprograms thereof.

The editing apparatus uses an IDL compiler 116 provided by an ORB and an ORB interface repository 108.

A repository 109 is a tool with a database in an external memory and includes an interface dictionary 110, a data item dictionary 111 and a document management function 112.

The data item dictionary 111 has definition information of the length and attribute of each of general data items. For example, data items such as date and name used by a plurality of applications are registered in the data item dictionary 111 and the registered data items are used for defining operation argument information and attribute information of an interface.

The interface dictionary 110 is registered with interface definition information which was previously defined.

The document management function 112 is stored with the interface information management unit 104 and the application information management unit 105 which are generated by the editor unit 101. Further, an IDL file, skeleton and stub files and a makefile are also registered in the document management function 112.

The data, information and file registered or stored in the repository are provided with unique object identifiers (ID's) applied by the repository. The registration in the repository means that the data, information or file is managed by the object ID. The substance of the data, information or file may exist at a place other than the repository.

The repository 109 may be used in common by a plurality of editing apparatuses. With the common use of the repository 109, information in the repository can be managed in a centralized manner and is accessable from a plurality of editing apparatuses.

An IDL file 113 is a file in an external memory which stores an IDL generated by the IDL generation unit 106. A source file 114 is a file in an external memory which stores a stub/skeleton generated by the IDL compiler 116. A makefile 115 is a file in an external memory which stores a makefile generated by the makefile generation unit 107.

Figure 2:
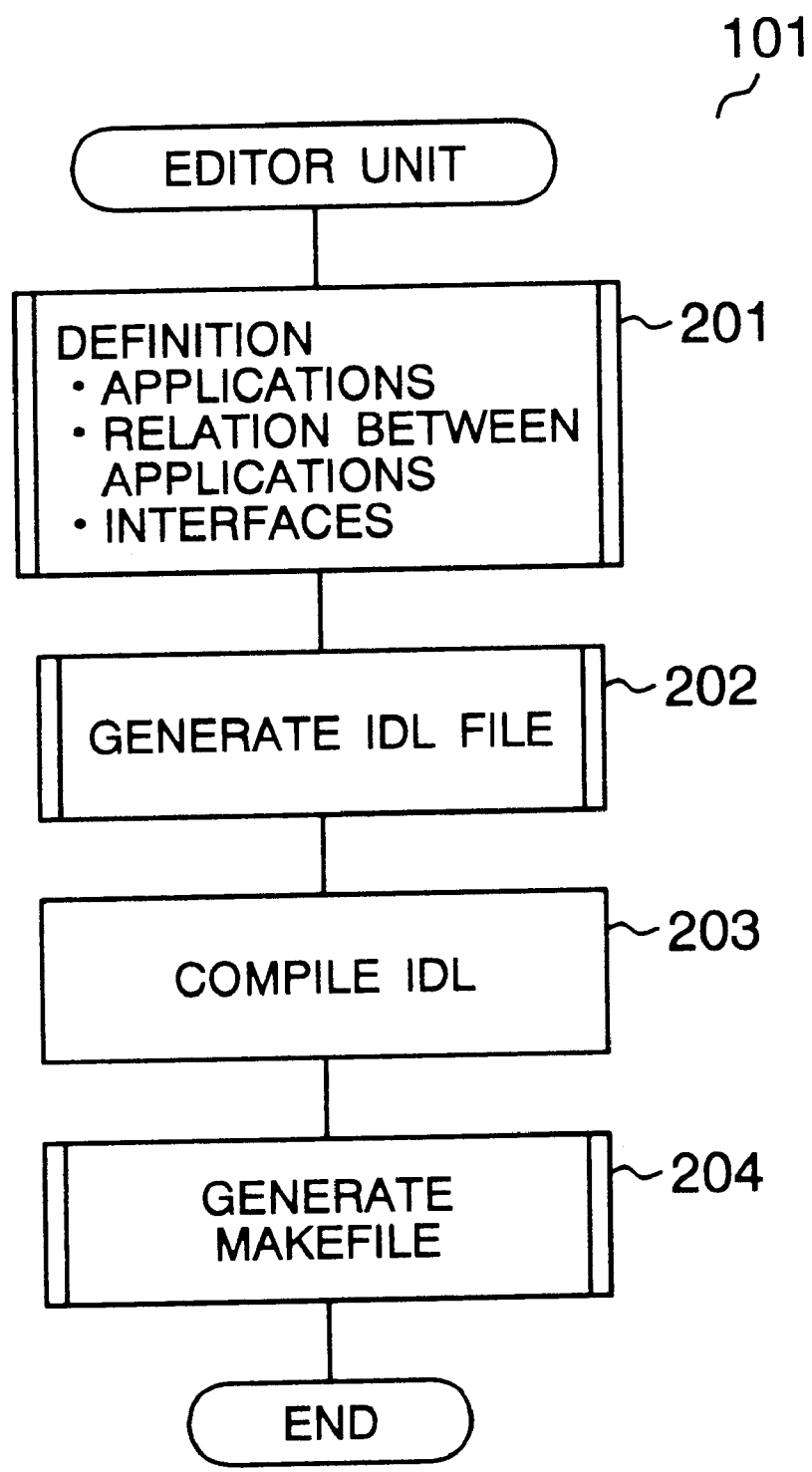
FIG. 2 is a flow chart showing the outline of a process performed by an editor unit in the embodiment.

FIG. 2 is a flow chart showing the epitomized operation of the editor unit 101.

The editor unit 101 is activated, for example, in such a manner that a developer clicks an icon on a display screen.

The editor unit 101 first provides or outputs a graphic display screen for the definition of applications and the definition of a relation between applications and makes the transfer from the graphic display screen to a display screen for displaying information for interface definition of applications, thereby urging the developer to input the definition (step 201).

When the input of the definition by the developer is completed, the editor unit 101 generates an IDL file from the information defined in step 201 (step 202).

Thereafter, the editor unit 101 activates the IDL compiler 116 of the ORB to compile the IDL file generated in step 202 (step 203).

The editor unit 101 analyzes the logical relation of a file generated in step 203 by use of the information defined in step 201 to generate a makefile (step 204), thereby completing the process.

Next, explanation will be made of the details of each step or processing of the editor unit explained in conjunction with FIG. 2.

Figure 3:
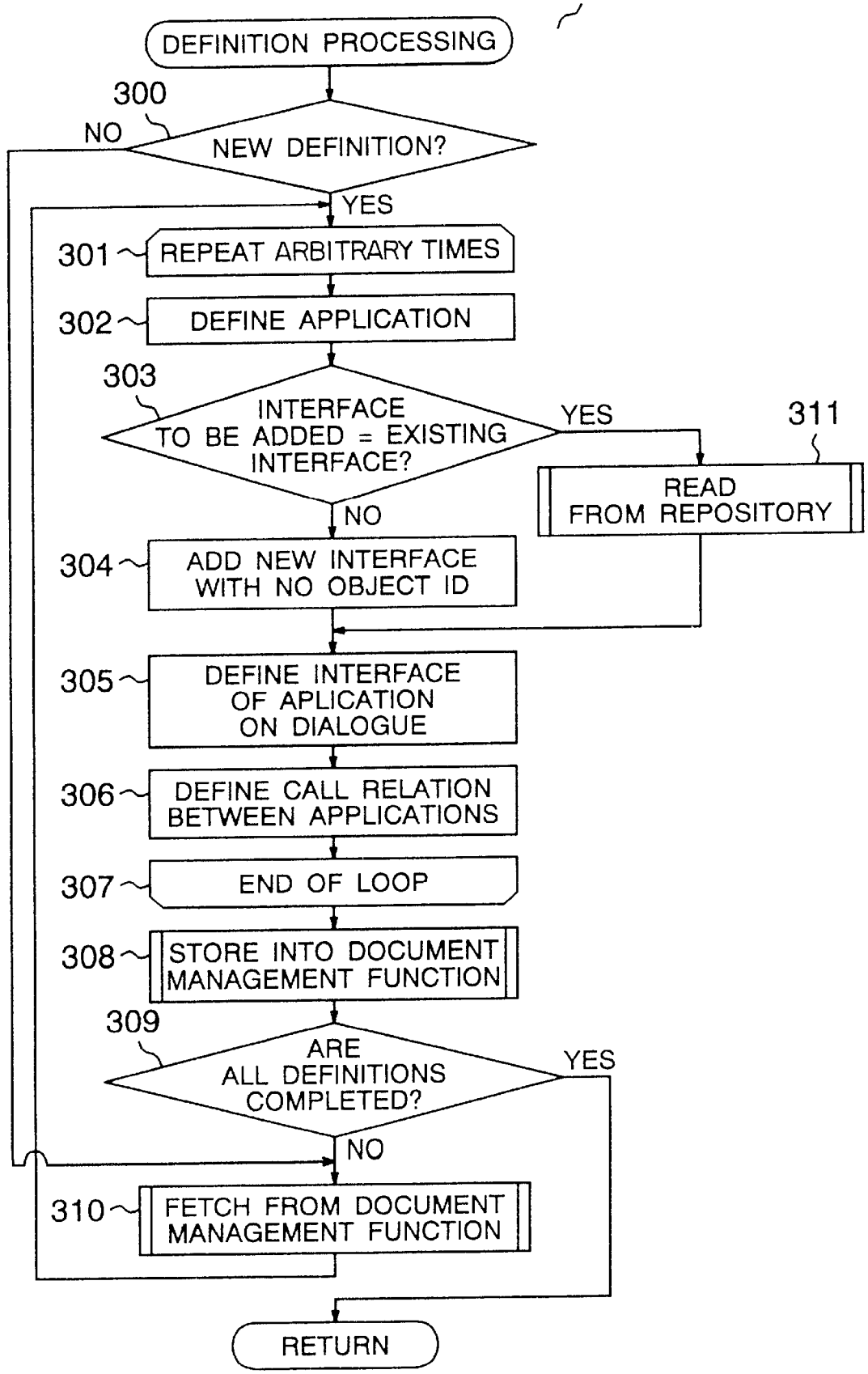
FIG. 3 is a flow chart showing an edition processing performed by the editor unit.

FIG. 3 is a flow chart of the definition processing 201 shown in FIG. 2.

Figure 5:
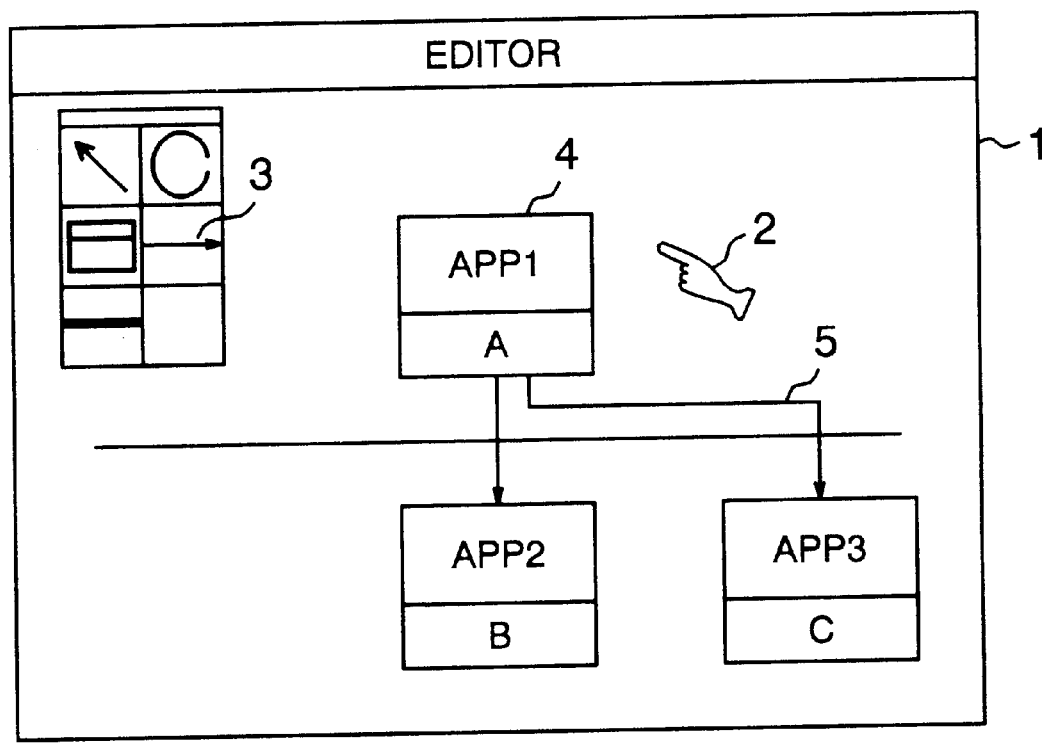
FIG. 5 shows an example of an editor display screen which displays an application structure defining diagram.

The editor unit 101 has a function of generating and displaying a diagram, as shown in FIG. 5, which is composed of a symbol representative of an application (or an application symbol), program interface definition information of an application, and an arrow symbol or the like representative of a call relation between applications.

Explanation will now be made of the case where the definition is to be newly made (step 300, Yes).

The editor unit 101 displays an editor display screen 1 and a button 3 which designates a drawing operation. Through a drawing operation selected by the depression of a button 3 selected from among a plurality of buttons by the operation of a pointer 2 by a pointing device (not shown) such as a mouse, the developer describes on the editor display screen 1 a symbol 4 which represents an application (or an application symbol) (step 302) and a symbol 5 which represents a call relation between applications (step 306). Further, the symbol 4 representative of an application arranged on the editor display screen 1 is selected by the developer, for example, through the clicking by a mouse. Thereby, the editor unit specifies interface information to be defined so that a dialogue (see FIG. 18) for defining the program interface of an application represented by the selected symbol is displayed. A change in the definition of the program interface by the dialogue is reflected by the symbol described on the editor display screen of the editor unit. (This corresponds to A, B or C in a square shown in FIG. 5.)

The interface may be defined through the diversion from the interface dictionary 110 registered in the repository 109 or the ORB interface repository 108 (step 303, Yes), or may be defined newly (step 303, No).

The developer inputs or changes each item on the displayed interface defining dialogue to interactively define the program interface of the application (step 305). Especially, for an item which needs the knowledge of a grammar prescribed for an interface definition language (IDL) as in the case where the type of an operation return value shown in FIG. 19 is defined, a list of values definable for that item is displayed to enable the selection by the developer. When a data item existing in the data item dictionary 111 structured in the repository 109 is designated in the case where the attribute of the program interface is defined, an object ID set by the repository 109 for this data item is set as attribute definition information to interface definition information in the interface information management unit 104. When an application structure definition file is fetched from the document management function 112 in the repository 109 or at the predetermined timings, an object ID is used as a key to acquire definition information of the corresponding data item from the data item dictionary 111 so that the attribute definition information of the interface is updated.

A call relation between applications is defined in such a manner that application symbols drawn on the screen are linked by an arrow (step 306). FIG. 5 shows that an application APP1 calls operations possessed by applications APP2 and APP3.

Figure 8:
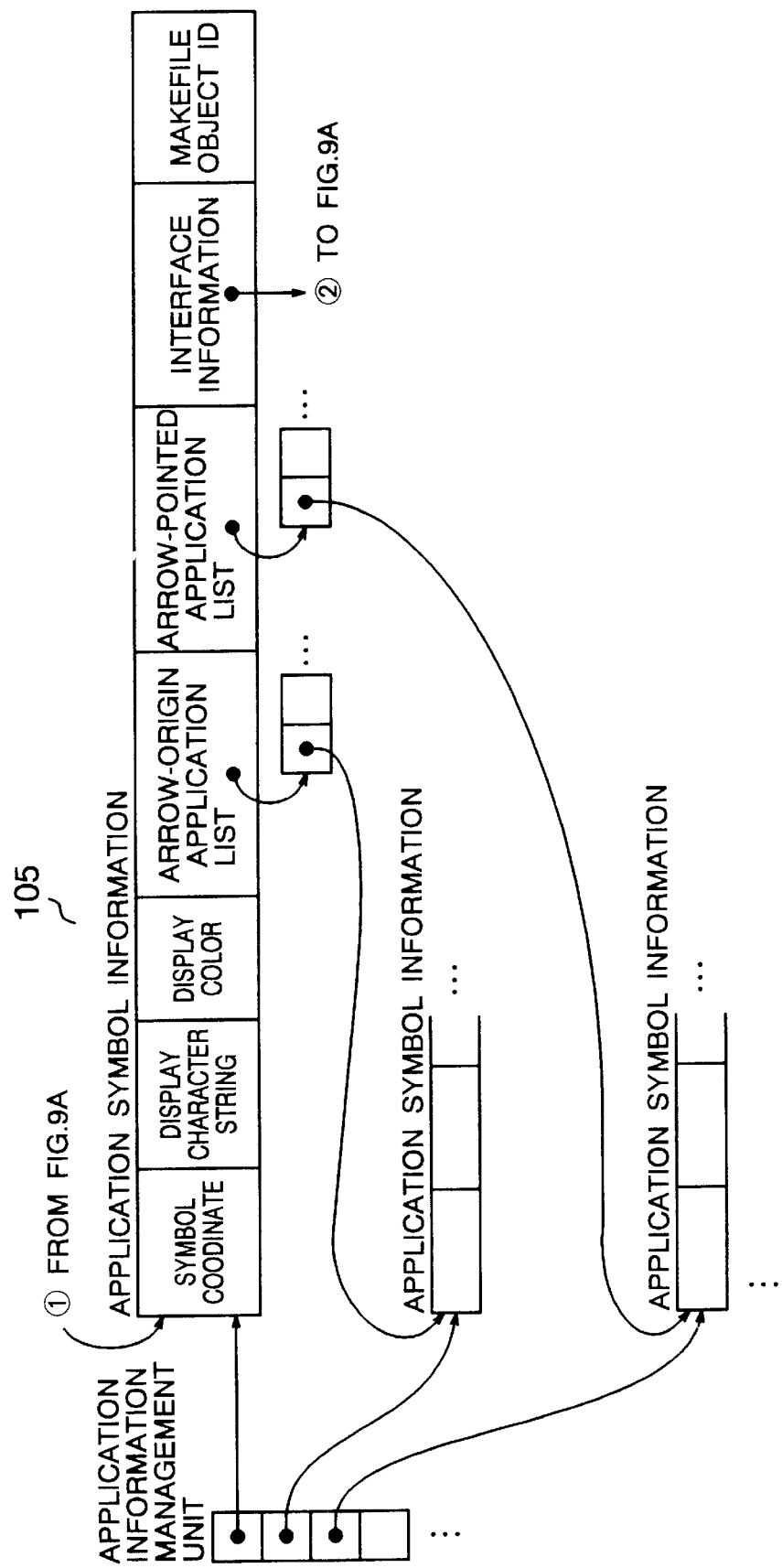
FIG. 8 is a diagram showing the table structure of an application information management unit.
Figure 9B:
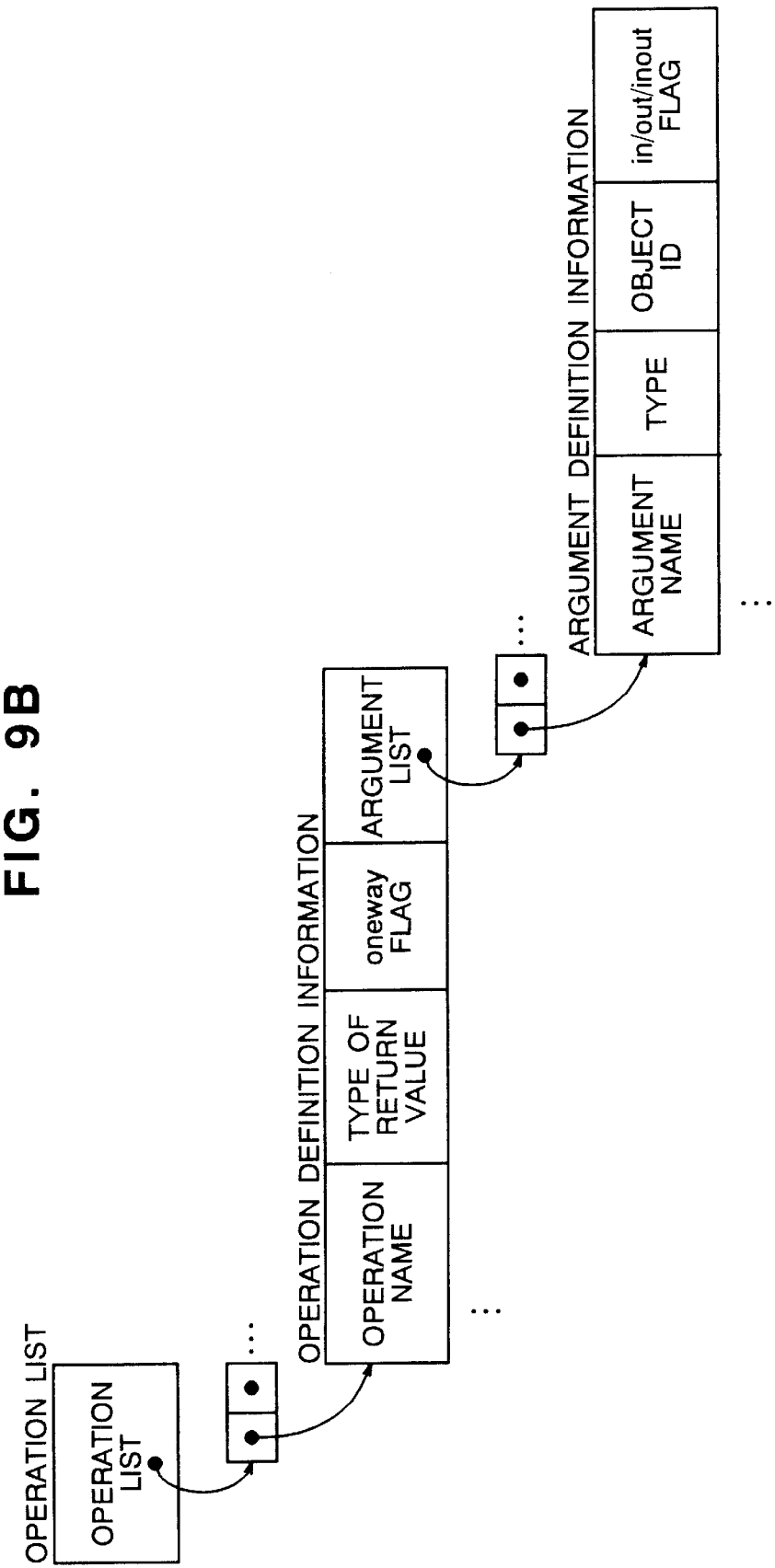
Figure 9C:
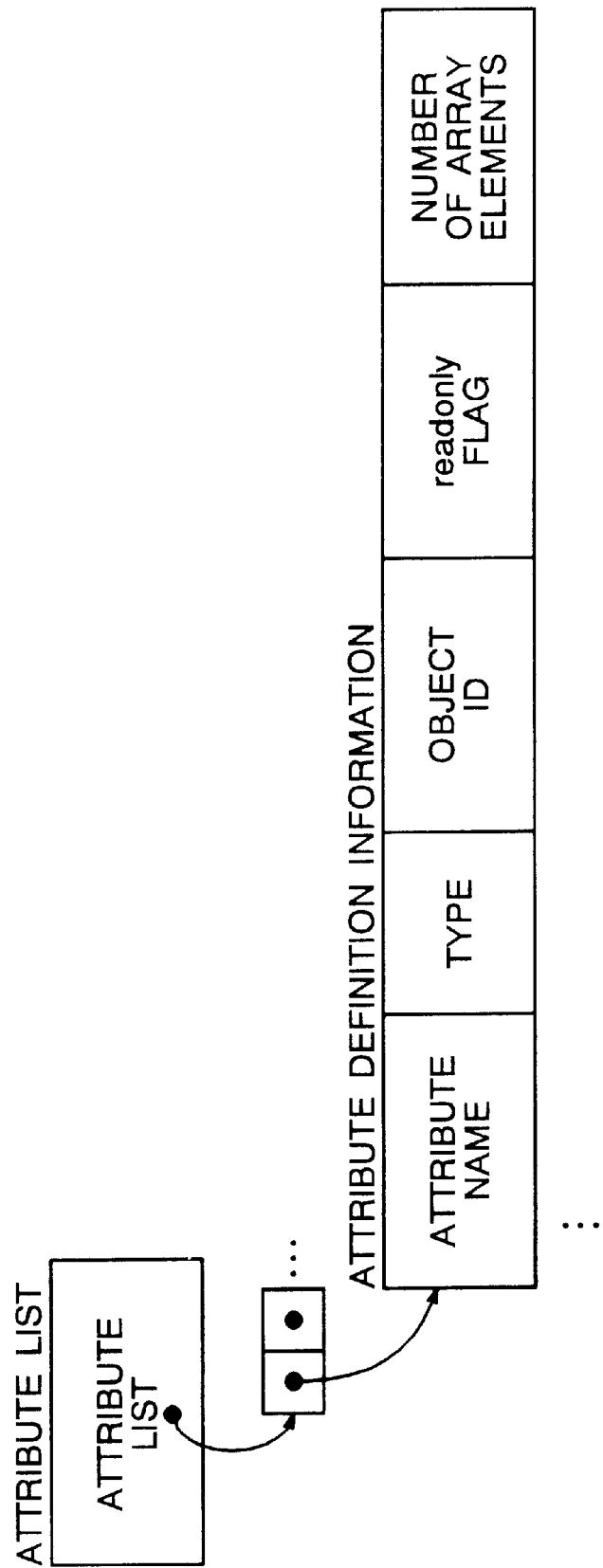

The described application symbol information is registered into the application information management unit 105. Now, in the case where the program interface of an application to be added is a new interface (step 302 in FIG. 3), symbol information of that application is registered into the application information management unit 105 while program interface definition information of that application is newly generated and is registered into the interface information management unit 104. Further, the symbol information of the application and the interface definition information of the application are associated with each other by pointers so that the reference to both the information can be made from each other. In order to indicate that the interface definition information has not yet been registered in the interface dictionary 110 in the repository 109, a value (for example, "−1") indicating no designation of an object ID for the interface definition information is set (step 304). The application symbol information as defined here is composed of information concerning the coordinate of the symbol, character string information and display color information for displaying the application symbols and the interface definition information on the editor display screen 1 displayed by the editor unit, and so forth, as shown in FIG. 8, in order that the application symbol can be edited and displayed on the screen. Also, the interface definition information is composed of an interface name, operation definition information, attribute definition information, an object ID of an IDL file to be generated, and so forth, as shown in FIGS. 9A, 9B and 9C. Operations and attributes defined in FIGS. 18 and 19 are stored in an operation list and an attribute list shown in FIGS. 9B and 9C.

Figure 4:
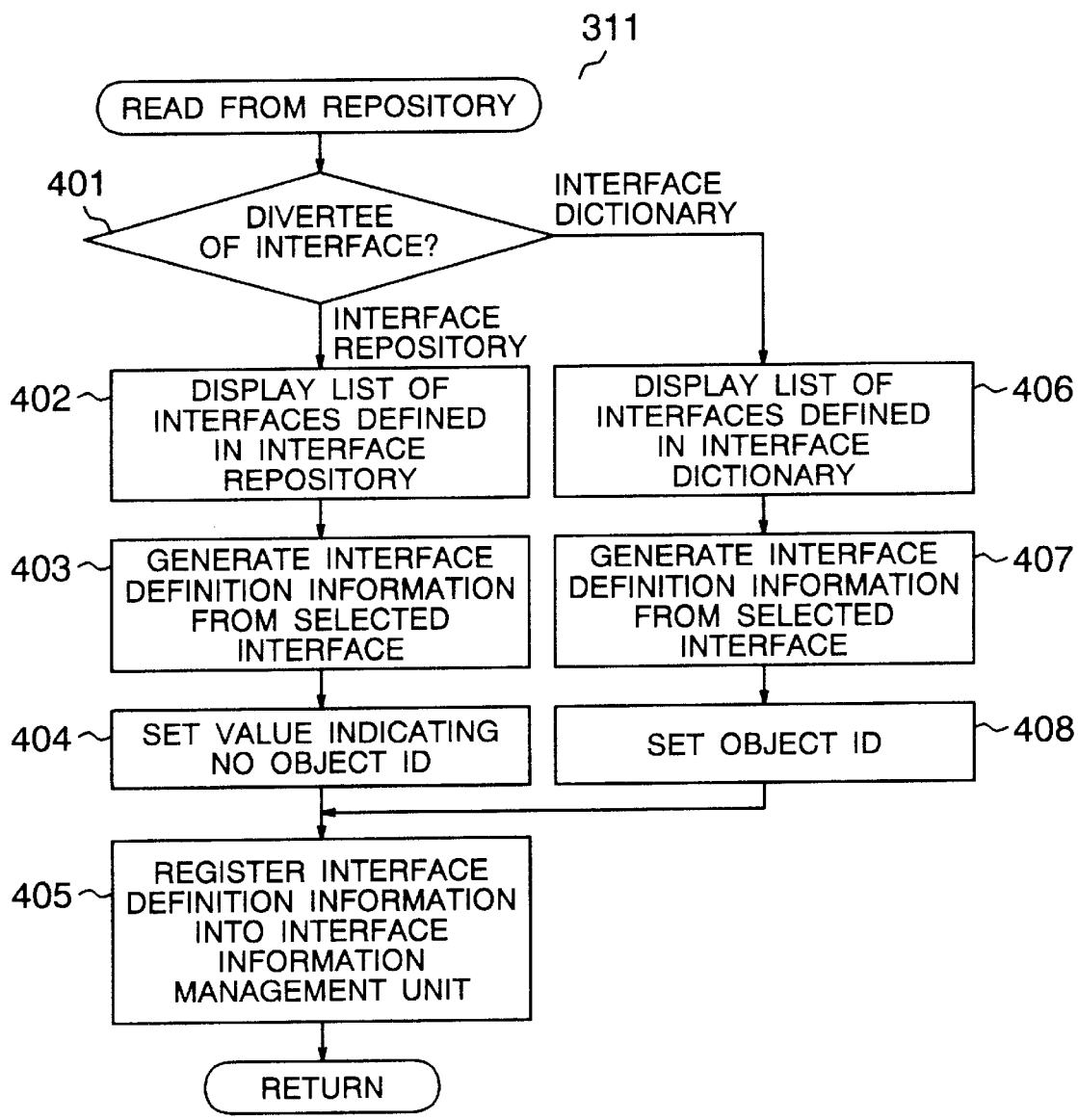
FIG. 4 is a flow chart showing a processing for reading interface definition from a repository.
Figure 16:
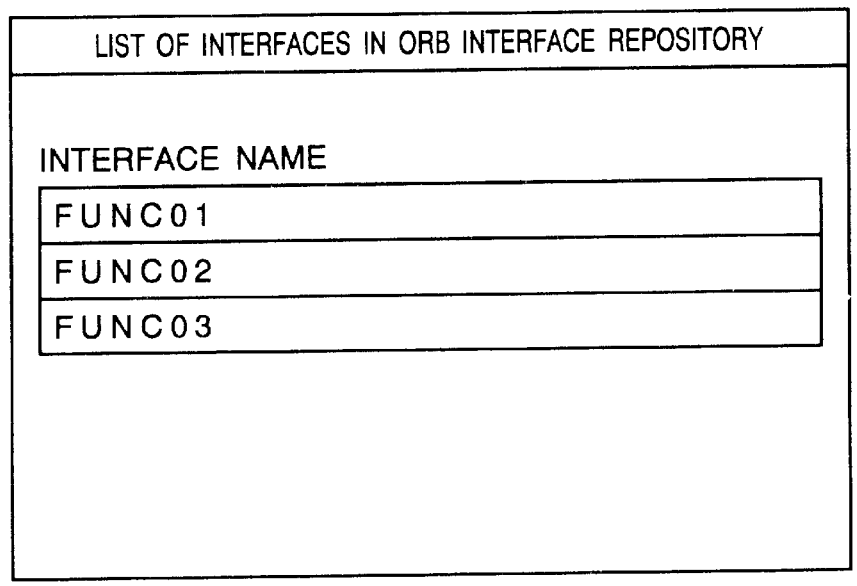
FIG. 16 shows an example of a display screen for displaying a list of interfaces registered in an ORB interface repository.
Figure 17:
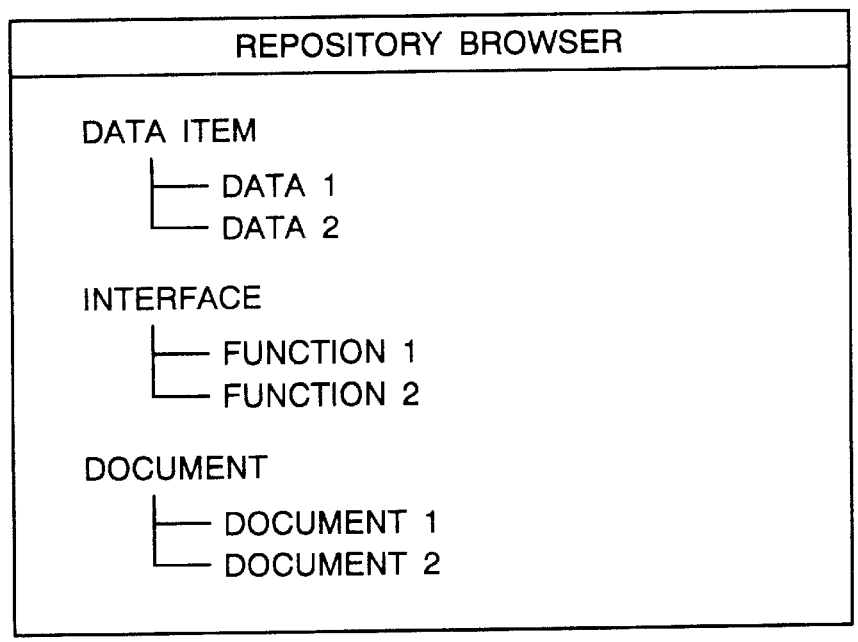
FIG. 17 shows an example of a display screen for displaying a list of objects registered in a repository.

FIG. 4 illustrates the flow of a processing for addition of interface definition information in the case where the program interface of the application to be added has already been registered in the ORB interface repository 108 or the interface dictionary 110 structured in the repository 109 and the registered interface is diverted therefrom (step 311 in FIG. 3). In the case where an interface registered in the ORB interface repository 108 is used as the program interface of the application to be added, the interface repository access unit 102 as one subprogram of the editor unit 101 outputs a display screen for displaying a list of interfaces registered in the ORB interface repository 108 (step 402 and FIG. 16) and generates interface definition information from information of an interface selected by the developer from the displayed list of interfaces (step 403). In order to indicate that the generated interface definition information has not yet been registered in the interface dictionary 110 in the repository 109, the interface repository access unit 102 sets a value (for example, "−1") indicating that no object ID is designated for this interface definition information (step 304). On the other hand, in the case where an interface registered in the interface dictionary 110 in the repository 109 is used as the program interface of the application to be added, the repository access unit 103 as one subprogram of the editor unit 101 activates a display screen (or repository browser) for displaying a list of dictionary items (or data items and interfaces) and documents in the repository 109 (step 406 and FIG. 17) and generates interface definition information from information of an interface selected by the user on the repository browser (step 407). An object ID defined by the interface dictionary 110 for this interface definition information is set for the generated interface definition information (step 408). The interface definition information generated in step 403 or 407 is registered into the interface information management unit 104 (step 405).

Returning to FIG. 3, when the definition of an application, the definition of a relation between applications and the definition of an interface by the developer is completed, the editor unit 101 stores the defined information into an application structure definition file and registers into the document management function 112 (step 308).

Figure 6:
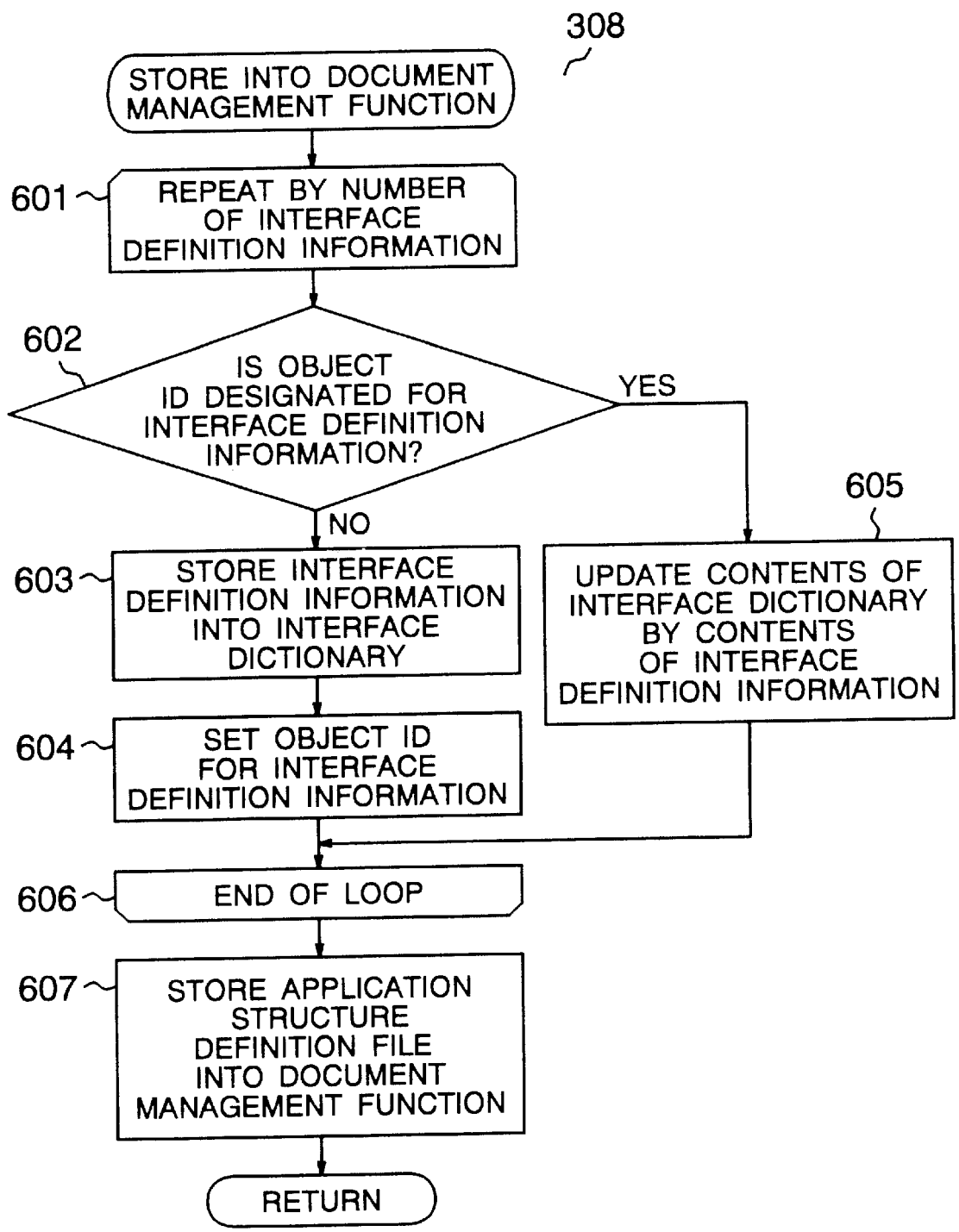
FIG. 6 is a flow chart of a processing for storing definition information into a document management function.

FIG. 6 shows a flow chart of a processing which corresponds to step 308 in FIG. 3, that is, a processing with which the application information management unit 105 and the interface information management unit 104 are registered as an application structure definition file into the document management function 112 in the repository 109. First, the object ID of interface definition information registered in the interface information management unit 104 is acquired. In the case where a value indicating no designation of an object ID for the interface definition information is set (step 602, No), this interface definition information is stored into the interface dictionary 110 in the repository 109 (step 603). At this time, an object ID applied by the interface dictionary 110 is set for the interface definition information (step 604). On the other hand, in the case where an object ID is designated for the interface definition information (step 602, Yes), information of the corresponding interface stored in the interface dictionary 110 is updated by the defined contents of each item of the interface definition information (step 605). When step 604 or 605 is completed for all of interface definition information registered in the interface information management unit 104, the application information management unit 105 and the interface information management unit 104 are stored into an application structure definition file and further registered into the document management function 112 (step 607).

With the above processing, the new interface definition information is registered in the dictionary 110 and the reuse thereof becomes possible. Also, the change of interface definition contents is automatically reflected in the dictionary.

Returning to FIG. 3 again, steps 300, 309 and 310 are processings performed in the case where the definition is not completed within one day and the definition processing is resumed on another day or in the case where definition information registered once in the document management function is corrected.

Figure 7:
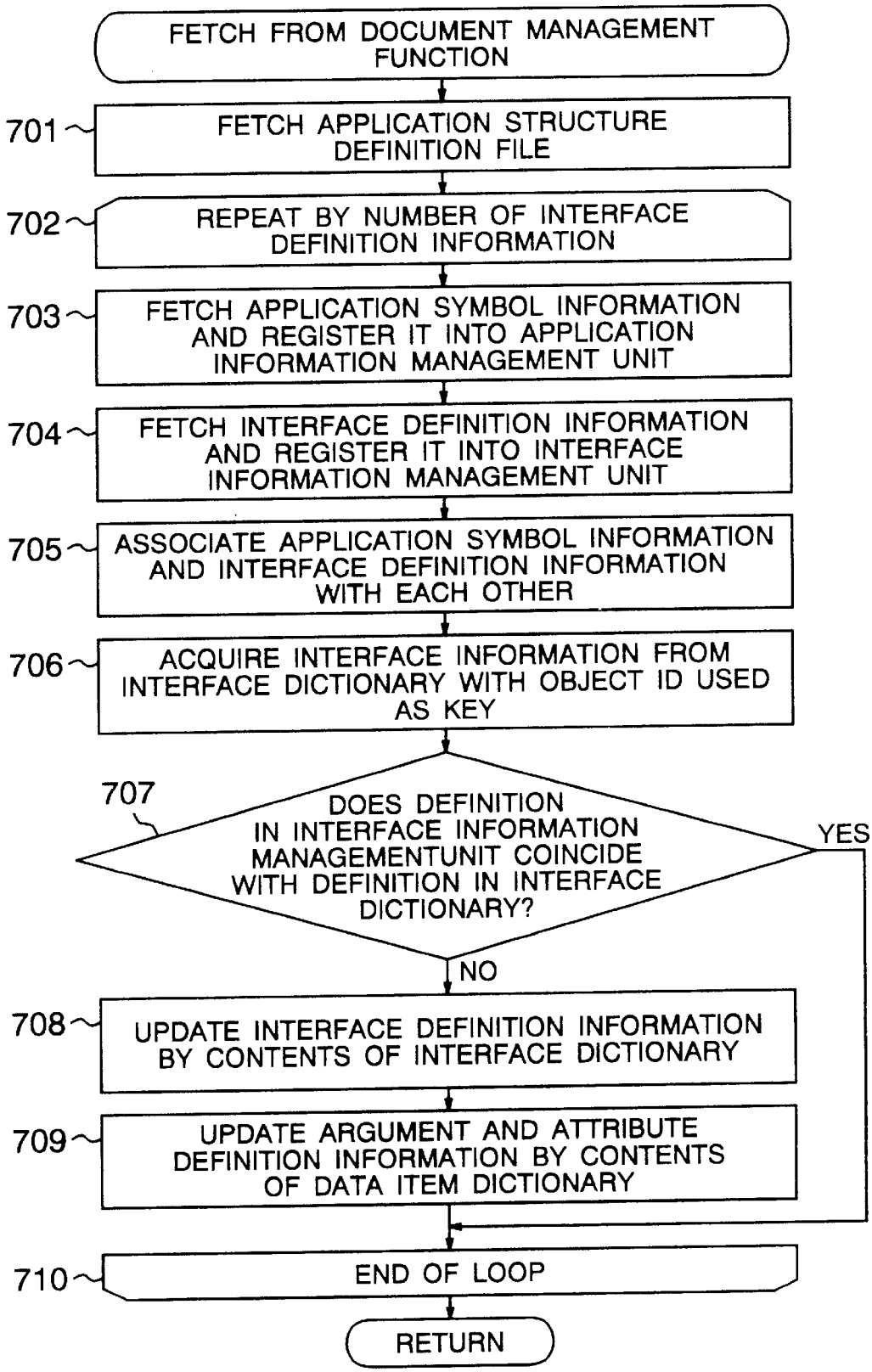
FIG. 7 is a flow chart of a processing for fetching information from the document management function.

FIG. 7 illustrates a processing which corresponds to step 310 in FIG. 3, that is, a procedure with which the application structure definition file stored in the document management function 112 is fetched therefrom. The editor unit 101 first fetches the application structure definition file stored in the document management function 112 (step 701). Application symbol information is fetched from the application structure definition file and is registered into the application information management unit 105 (step 703). Further, interface definition information is fetched from the application structure definition file and is registered into the interface information management unit 104 (step 704). Pointers for the reference to the application symbol information and the corresponding interface definition information from each other are generated (step 705). An object ID set for the interface definition information obtained in step 704 is used to acquire information of an interface from the interface dictionary 110 in the repository 109 (step 706). In the case where the value of each item of the interface definition information registered in the interface information management unit 104 is different from the value of each item of the interface information acquired from the interface dictionary 110 (step 707, No), the value of each item of the interface definition information registered in the interface information management unit 104 is updated by the value of each item of the interface information acquired from the interface dictionary 110 (step 708). Further, an object ID of attribute information and an object ID of argument information registered in the interface definition information are used to fetch a data item from the data item dictionary 111 in the repository 109. Attribute definition information and argument definition information are generated from the acquired data item and are registered into the interface definition information (step 709). The above processing is performed for all of interface definition information registered in the interface information management unit 104.

The editor unit 101 fetches the already defined information from the restored application information management unit 104 and interface information management unit 105 to display it in a form shown in FIG. 5, thereby urging the developer into correction and/or addition.

When the definition using the application structure defining diagram is entirely completed, the editor unit 101 performs the automatic generation of an IDL file (step 202 in FIG. 2).

Figure 12:
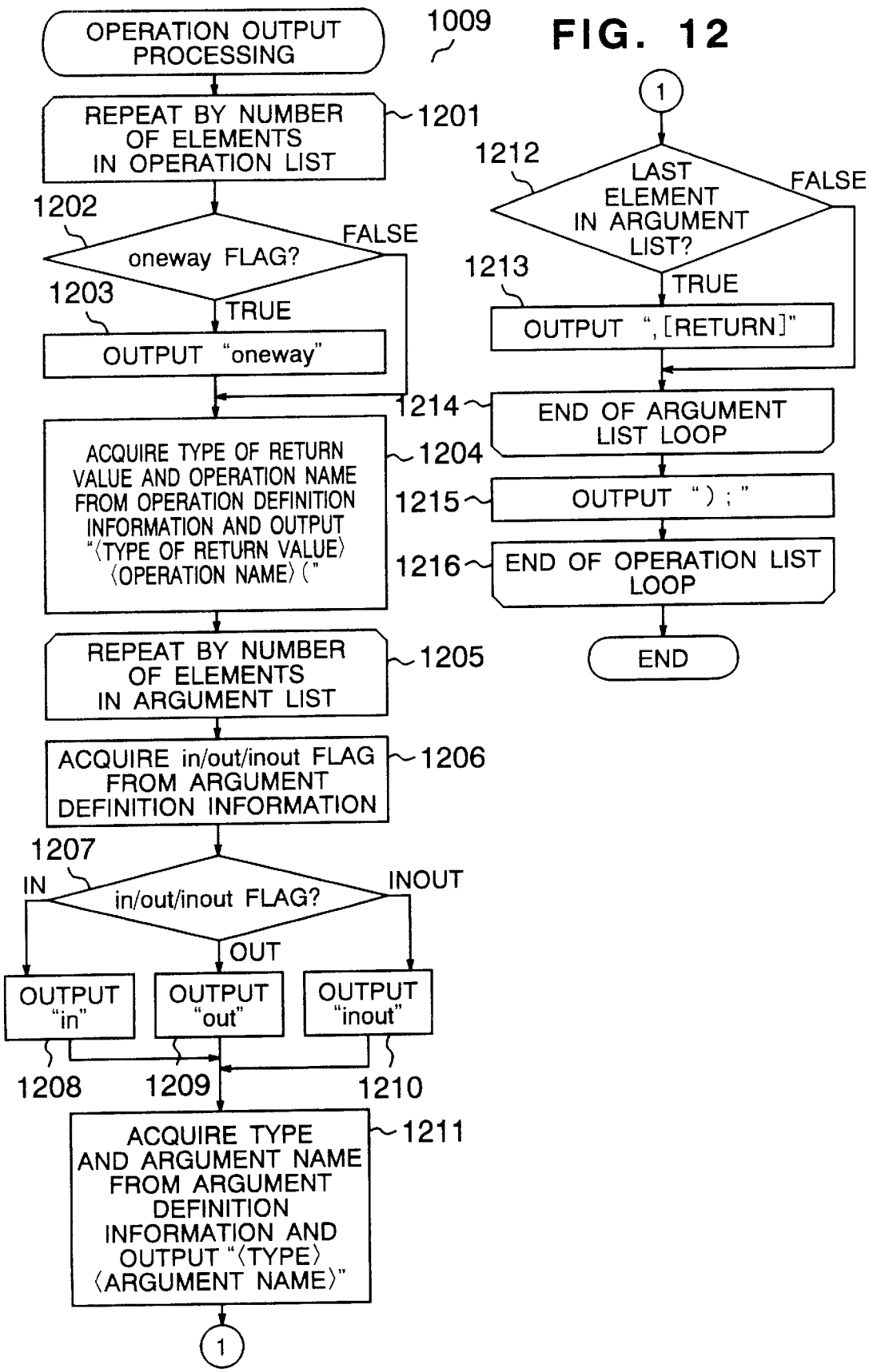
FIG. 12 is a flow chart of a processing for outputting an operation to the IDL file.

Flow charts for generation of the IDL file are shown in FIGS. 10, 11 and 12.

Referring to FIG. 10, the IDL generation unit 106 as one subprogram of the editor unit 101 acquires application symbol information, corresponding to an application symbol selected by the developer, from the application information management unit 105 (step 1001). Interface definition information pointed from the acquired application symbol information is acquired from the interface information management unit 104 (step 1002). Next, an IDL file name is acquired from the interface definition information to open an IDL file (step 1003). An interface name (steps 1004 to 1007), attributes (step 1008) and operations (step 1009) are written into the opened IDL file and the file is then closed (steps 1010 to 1011).

The details of the attribute output processing in step 1008 and the operation output processing in step 1009 will now be described by use of FIGS. 11 and 12.

In the attribute output processing shown in FIG. 11, an attribute list (see FIG. 9C) pointed from interface definition information is read and is then written into the IDL file with a format changed (steps 1101 to 1110).

In the operation output processing shown in FIG. 12, an operation list (see FIG. 9B) pointed from interface definition information is read and is then written into the IDL file with a format changed (steps 1201 to 1216).

The editor unit 101 stores the thus generated IDL file 113 into the document management function 112 and registers an object ID applied by the document management function 112 into interface definition information in the interface information management unit 104.

After the generation and registration of the IDL file, the editor unit 101 activates the IDL compiler 116 provided by the distributed application executing environment or ORB to compile the generated IDL file by the IDL compiler 116 of the ORB so that a source file and a header file for skeleton and a source file and a header file for stub obtained by the compilation are stored into the document management function 112 and an object ID of each file applied by the document management function 112 is registered into the interface definition information in the interface information management unit 104 (step 203 in FIG. 2).

Thereafter, the editor unit 101 generates a makefile for the compilation and linkage of each application (step 204 in FIG. 2).

The generation of the makefile is performed by the makefile generation unit 107 which is one subprogram of the editor unit 101.

Figure 13:
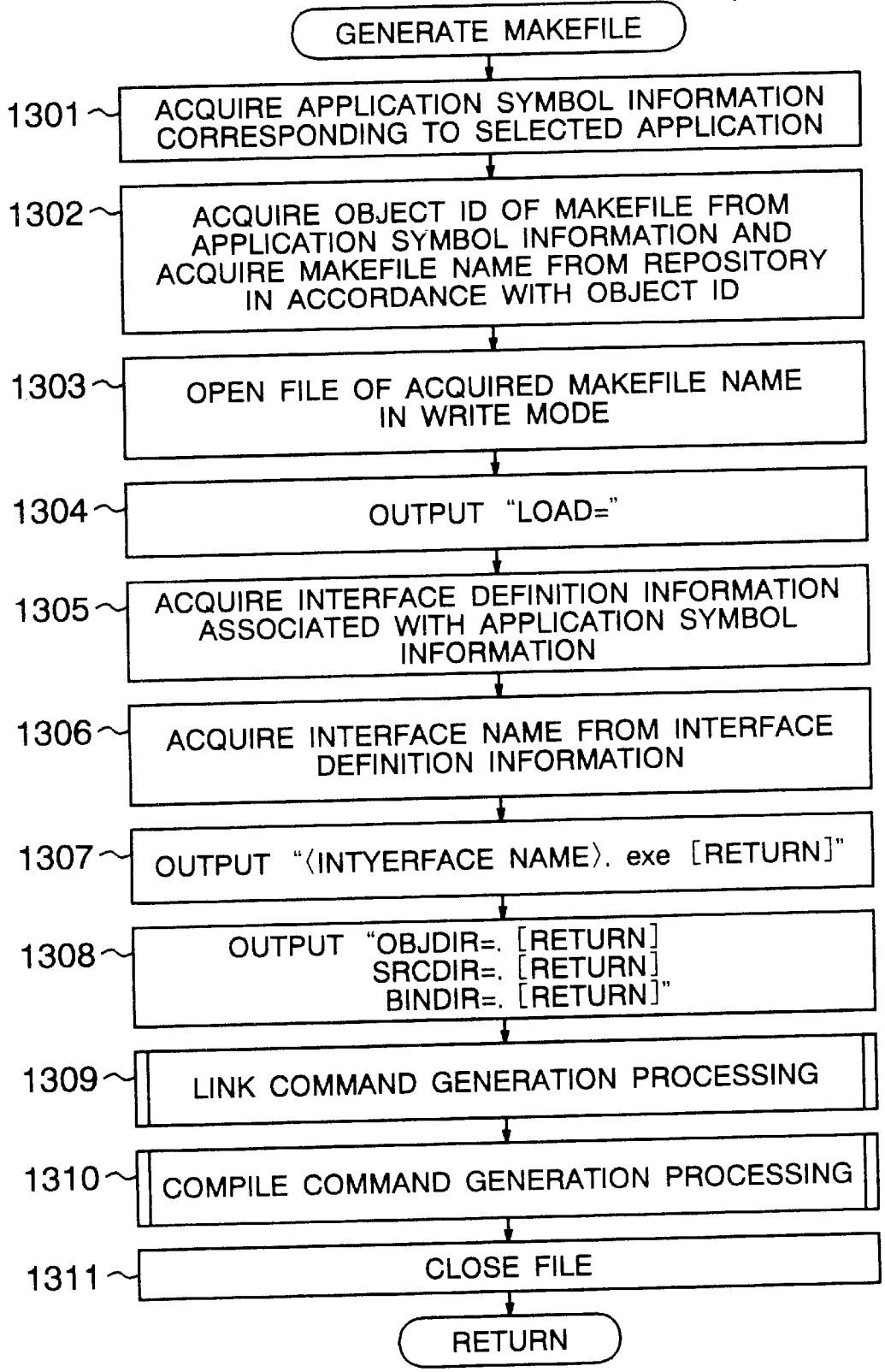
FIG. 13 is a flow chart showing a makefile generation processing performed by the editor unit.
Figure 14:
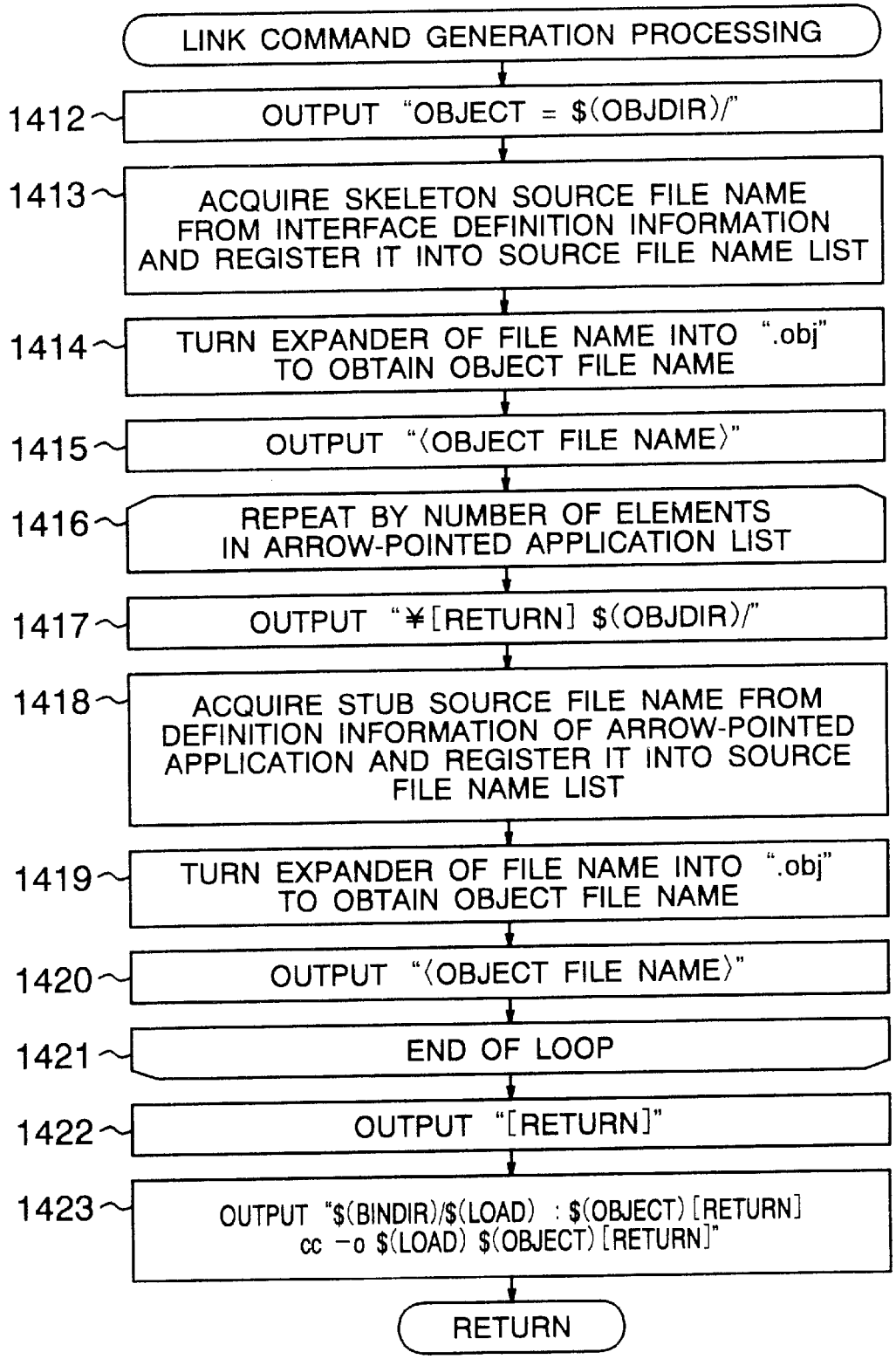
FIG. 14 is a flow chart of a processing for outputting a link command to a makefile.
Figure 15:
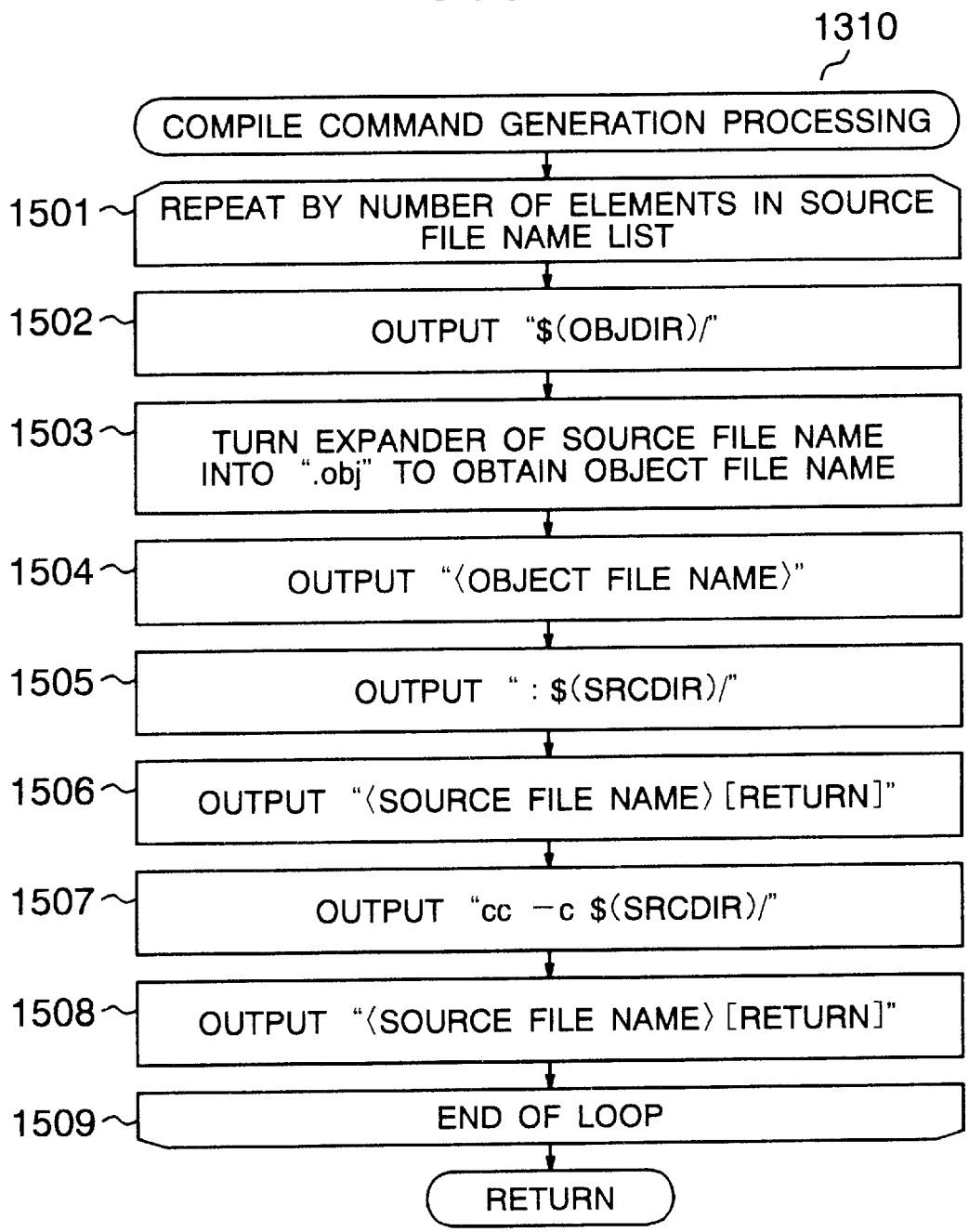
FIG. 15 is a flow chart of a processing for outputting compile commands to the makefile.

A procedure for generating the makefile is shown in FIGS. 13 to 15.

Referring to FIG. 13, application symbol information corresponding to an application subjected to the generation of a makefile is acquired by the makefile generation unit 107 from the application information management unit 105 (step 1301). The makefile generation unit 107 specifies a makefile name from an object ID (step 1302) to open a file having the specified file name (step 1303). The makefile generation unit 107 acquires interface definition information associated with the application symbol information from the interface information management unit 104, acquires an interface name, and writes information into the file with a format changed (steps 1304 to 1308).

Next, the makefile generation unit 107 performs a link command generation processing for application generation (step 1309) and a compile command generation processing for each application forming program (step 1310) and then closes the file (step 1311).

The details of the link command generation processing are shown in FIG. 14.

Figure 20:
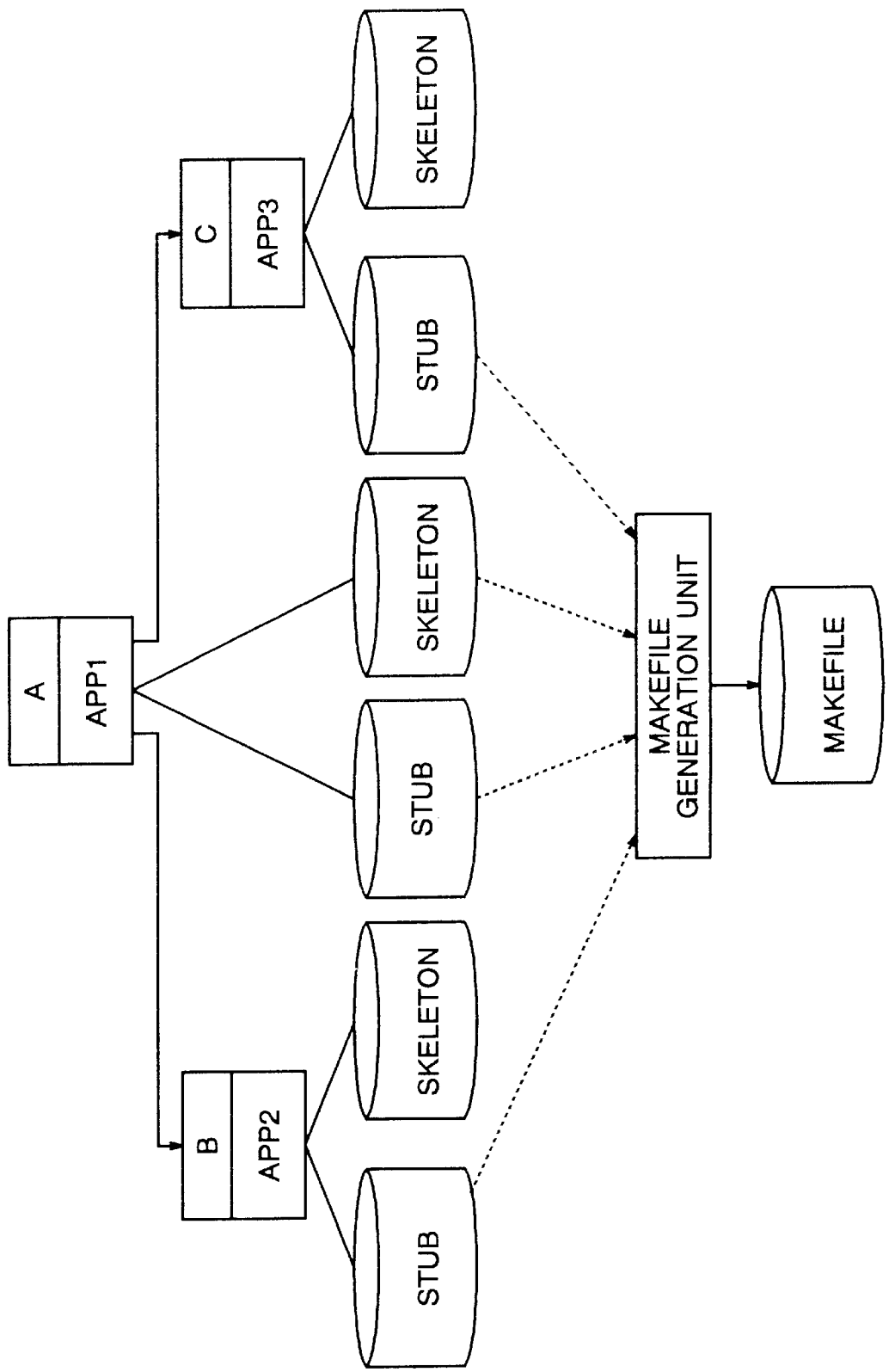
FIG. 20 is a diagram showing a relation between files.

Referring to FIG. 14, the makefile generation unit 107 fetches the skeleton source and header file names and the stub source and header file names from the document management function 112 in accordance with the object ID's stored in interface definition information (step 1413). Applications providing operations to the application subjected to the generation of a makefile can be specified by arrows which are connected to the subjected application on the application structure defining diagram generated by the editor unit and the direction of that arrow. For example, when a makefile of an application APP1 is to be generated, as shown in FIG. 20, applications APP2 and APP3 provide operations to the application APP1. Application symbol information of all the thus specified operation providing applications is acquired from the application information management unit 105 (step 1416). Interface definition information pointed by the acquired application symbol information is acquired from the interface information management unit 104, and source file names and header file names for stubs are fetched from the document management function 112 in accordance with object ID's stored in the acquired interface definition information (step 1418). Thus, the searched-out relevant file names are written as a link command into a makefile with a format changed (other steps).

In FIG. 15, the makefile generation unit 107 generates a compile command for each source file name acquired in FIG. 14 and writes the generated compile command into the makefile (steps 1501 to 1509).

The editor unit 101 stores the generated makefile into the document management function 112. An object ID of the makefile applied by the document management function 112 is registered into the application symbol information in the application information management unit 105.

In the example shown in FIG. 20, files aggregated by a makefile for an application APP1 include a source file and a header file for skeleton and a source file and a header file for stub which are provided for the application APP1, a source file and a header file for stub which are provided for the application APP2, and a source file and a header file for stub which are provided for the application APP3.

After the completion of generation of the makefile, the editor unit 101 registers the interface information management unit 104 and the application information management unit 105 on the memory as an application structure definition file into the document management function 112 again, thereby completing the overall process.

The table structures and flow charts disclosed in conjunction with the foregoing embodiment are shown by way of example. They may be realized in other formats or forms.

The conversion in format from definition information into IDL file changes in accordance with an IDL format which ORB supports.

The present invention is also applicable to a communication base other than the distributed application executing environment (or ORB) used in the present embodiment. Though the generation of an IDL file in the embodiment is performed after the definition of program interfaces and the definition of a call relation between applications are fully completed, the IDL file may be generated each time a program interface of one application is defined.

In the embodiment, the generation of an IDL file, the compilation of the IDL file and the generation of a makefile are performed for an application designated by a developer. However, the editing apparatus may perform the generation of an IDL file, the compilation of the IDL file and the generation of a makefile for all defined applications.

According to the present invention, there is provided an apparatus in which the definition of the structure of applications and the definition of program interfaces of applications in the development of a C/S system are interactively performed by use of a graphical display screen with no consciousness of the grammar of an IDL so that an IDL file and a makefile are automatically outputted. Thereby, the present invention offers an effect that the reduction of a load imposed on a developer and the insurance of a quality can be attained.

We claim:

1. A program design supporting apparatus for supporting the design of a plurality of programs distributed on a network and operated through the communication between the programs, comprising:

program definition means for storing definition information of each of said programs in response to input of a user;

inter-program relation definition means for storing a relation between said programs in response to input of the user;

interface definition means for storing interface information of each of said programs in response to input of the user; and means for converting the interface information stored for each of said programs into an interface definition language (IDL) format to generate an IDL file.

2. A program design supporting apparatus according to claim 1, wherein said program definition means and said inter-program relation definition means provide a graphic display screen to which a program represented by a symbol and a relation between programs represented by an arrow are inputted as definition information by the user, and said interface definition means inputs information defined by the user in an interactive manner.

3. A program design supporting apparatus according to claim 1, further comprising a repository for storing and managing the interface information and data items, said interface definition means reading the interface information and a data item from said repository so that they are used for the interface definition.

4. A program design supporting apparatus according to claim 3, wherein said repository manages information therein in a form applied with an identifier, and said interface definition means stores therein the identifiers of the interface information and the data item in said repository used for the interface definition and makes access to the latest information in said repository at a predetermined timing to update the interface information which has already been defined.

5. A program design supporting apparatus according to claim 3, wherein said program definition means, said inter-program relation definition means and said interface definition means register the defined information into said repository, and a plurality of said program definition means, a plurality of said inter-program relation definition means and a plurality of said interface definition means make access to said repository.

6. A program design supporting apparatus according to claim 1, further comprising:
means for IDL-compiling the generated IDL file and managing a file generated by the compilation; and
means for generating a makefile of each program from information defined by said program definition means and said inter-program relation definition means and information managed by said IDL-compiling means.

7. A program design supporting method for supporting the design of a plurality of programs distributed on a network and operated through the communication between the programs, comprising the steps of:
defining each of said programs;
defining a relation between said programs, the definition of each program and the definition of the relation between the programs being performed by providing a graphic display screen to which a program represented by a symbol and a relation between programs represented by an arrow are inputted as definition information by a user;
defining interface information of each of said programs, the definition of interface information being performed by inputting information defined by the user in an interactive manner;
converting the interface defined for each of said programs into an interface definition language (IDL) format to generate an IDL file;
IDL-compiling the generated IDL file and managing a file generated by the compilation; and
generating a makefile of each program from the defined program information, the defined inter-program relation information and the compiled and managed file information.

8. A program storage device readable by a machine, tangibly embodying a program of instructions executable by the machine to perform method steps for supporting the design of a plurality of programs distributed on a network and operated through the communication between the programs, said method steps comprising:
defining each of said programs;
defining a relation between said programs, the definition of each program and the definition of the relation between the programs being performed by providing a graphic display screen to which a program represented by a symbol and a relation between programs represented by an arrow are inputted as definition information by a user;
defining interface information of each of said programs, the definition of interface information being performed by inputting information defined by the user in an interactive manner;
converting the interface defined for each of said programs into an interface definition language (IDL) format to generate an IDL file;
IDL-compiling the generated IDL file and managing a file generated by the compilation; and
generating a makefile of each program from the defined program information, the defined inter-program relation information and the compiled and managed file information.

9. A computer system, comprising:
a memory which stores an editing program;
an input unit;
a display unit; and
a host processor which executes said editing program to support design of a plurality of application programs distributed on a network by:
providing a graphical display, via said display unit, definition of application programs, definition of a logical relation between application programs, and interface definition of application program;
when a user inputs, via said input device, the definition of a selected application program, the definition of the logical relation between application programs, and the interface definition of the selected application program, generating an interface definition language (IDL) file based on the input information;
compiling the interface definition language (IDL) filed; and
generating a makefile of the selected application program based on the input information and the compiled interface definition language (IDL) file.

10. A computer system according to claim 9, wherein said host processor further executes said editing program to acquire data items necessary for definition of arguments and attributes of a program interface of the selected application program from dictionary data managed by a repository, and to automatically update the arguments and attributes of the program interface when the dictionary data is changed.

11. A computer system according to claim 10, wherein said repository corresponds to a centralized database on the network for storing and managing interface definition information and data items.

12. A computer system according to claim 10, wherein said host processor further executes said editing program to read interface definition of the selected application program and edits the interface definition on a diagram which defines the logical relation between application programs.

13. A computer system according to claim 12, wherein said host processor further executes said editing program to generate said makefile by specifying stub files and header files of related application programs from the logical relation between application programs and a stub file, a skeleton file and a header file generated by the compilation of said interface definition language (IDL) file of the selected application program.

14. A computer system according to claim 13, wherein said repository corresponds to a centralized database on the network for storing and managing interface definition information and data items.

15. A computer system according to claim 9, wherein said host processor further executes said editing program to read interface definition of the selected application program and edits the interface definition on a diagram which defines the logical relation between application programs.

16. A computer system according to claim 9, wherein said host processor further executes said editing program to store contents of a structure of the selected application program, the logical relation between application programs and the interface definition of the selected application program into a repository such that the contents to be edited are fetched from said repository.

17. A computer system according to claim 16, wherein said repository corresponds to a centralized database on the network for storing and managing interface definition information and data items.

18. A computer system according to claim 9, wherein said host processor further executes said editing program to generate said makefile by specifying stub files and header files of related application programs from the logical relation between application programs and a stub file, a skeleton file and a header file generated by the compilation of said interface definition language (IDL) file of the selected application program.

\* \* \* \* \*